May 1, 1962    H. JANESKA    3,031,913
SPOTTING-SCOPE
Filed May 26, 1959
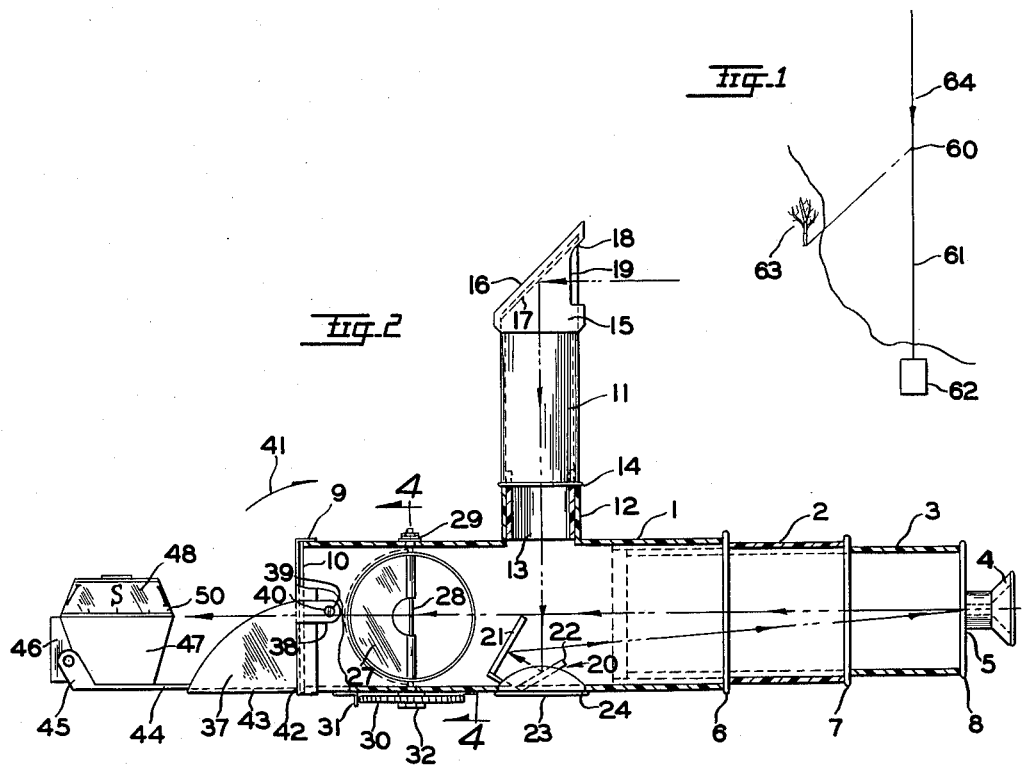
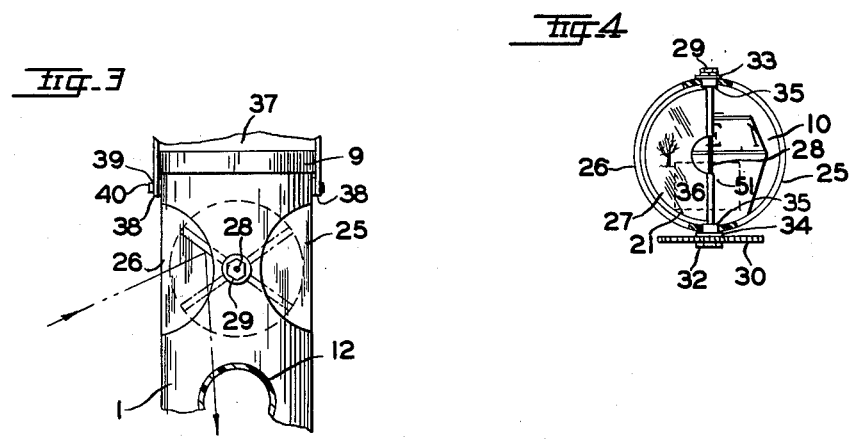
INVENTOR.
HENRY JANESKA
BY
Oberlin, Maky & Donnelly
ATTORNEYS United States Patent Office 3,031,913
Patented May 1, 1962

3,031,913
SPOTTING-SCOPE
Henry Janeska, 372 North St., Chagrin Falls, Ohio
Filed May 26, 1959, Ser. No. 815,937
9 Claims. (Cl. 88—2.4)

This invention relates as indicated generally to a spotting-scope and more particularly to a device specifically designed to assist fishermen in relocating spots or areas on water that have proven to be exceptionally good for fishing.

In the past, fishermen have employed sighting boards or other rather crude triangulation devices in an attempt to assist the proper navigation of their usually small boats to a spot which has proven to be an exceptionally good fishing area. Instruments employing optical light paths have generally been considered much too expensive and intricate for such a mundane purpose. Moreover, the operation and manipulation of such instruments requires considerable skill and, moreover, requires considerable space to store safely on a small fishing craft. An example of the plotting board type of triangulation devices that fishermen have had to employ may be seen in the disclosure of the patent to Herrick, 2,679,105. An example of the complex navigation instruments which would be for fishermen far to costly and difficult to operate may be seen in the disclosure of the patent to Carbonara, 1,966,845. Accordingly, a relatively inexpensive device utilizing the advantages of the more complex light-path instruments employing compasses and mirrors that would be easy to operate would be of great assistance to fishermen to aid them to return to favorable fishing locations.

It is accordingly a principal object of my invention to provide a sighting device for fishermen to assist them to return to an advantageous fishing location which can be easily manufactured and which is easy to operate.

It is a further principal object of my invention to provide a simplified triangulation device which may readily be carried in small boats and which will occupy a minimum of area for storage purposes.

It is yet another object of my invention to provide a simplified sighting device that may be used by small pleasure craft operators as a navigational aid.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawing:

FIG. 1 is a diagrammatic view of exemplary azimuths which can be utilized in assisting a fisherman to return to an advantageous fishing location when employing my sighting device;

FIG. 2 is a side elevation of my sighting device partially in section with the parts thereof extended in operating position;

FIG. 3 is a fragmentary top plan view illustrating the windows in the body of my sighting device; and FIG. 4 is a vertical section taken generally on the line 4—4 of FIG. 2.

Referring now to the drawing and more particularly to FIG. 2 thereof, I have illustrated a spotting-scope constructed in accordance with my invention which generally comprises a main body 1 of tubular configuration. The body illustrated is in the form of a right circular cylinder but as the description proceeds, it will become evident that the cross-sectional configuration of the body may be of any suitable shape. In the back or right hand end of the body, as seen in FIG. 2, I provide suitable slidable extensions 2 and 3, extension 3 having secured thereto centrally thereof, a suitable eye piece 4. The eye piece 4 is of conventional construction and may be threadedly secured in a suitable opening in the end of extension 3 as shown at 5. The extensionable sections 2 and 3 as well as the end of body 1 are formed with annular beads 6, 7 and 8 which act as stops for the telescoping of the extensions 2 and 3 and moreover, add to the general attractive appearance of the entire unit.

Secured to the front of the body 1 by a metal retaining ring 9 is a transparent plate 10 which may, for example, be made of glass or a transparent plastic material. In this manner, it will be seen that the body 1 together and the extensions 2 and 3 form an elongated tubular sight passage when in their extended position.

Generally centrally of the body 1, I provide a top scope tube 11. The body 1 is provided with a top annular extension 12 and the scope tube has a sliding frictional fit within such extension as shown at 13. In this manner, the scope tube may be pulled out of the extension 12 for storage purposes. The end of the tube has a suitable annular stop 14 thereon abutting the top of the extension 12 further to assist in the easy assembly thereof with the body 1. The top of the scope tube is provided with a cap 15, the configuration of which is shown in FIG. 2. The top of the tube is beveled at an angle of approximately 45° and the cap 15 slides over the top thereof and has a suitably similarly beveled portion 16 adapted to enclose the top of the tube 11. Mounted on the interior of the beveled or angled top 16 of the cap 15 is a suitable reflecting mirror 17. The elongated side of the cap 15 has a suitable opening or aperture 18 therein and may be provided with a window 19. It is noted that extensions 12 and 13 of the body 1 and tube 11 respectively, may be provided with suitably mating aligning tongue and groove portions whereby the window 19 may readily be positioned to face in the correct direction.

Opposite the extension 12 on the body 1 is a suitable reflecting mirror assembly generally shown at 20. The assembly 20 generally comprises a first mirror 21 and a second mirror 22 which are fixedly mounted on a plug 23 which may be either frictionally engaged or threaded within an aperture 24 of the body 1. Such aperture is located directly diametrically opposite the transverse extension 12. The mirrors 21 and 22 have their reflective surfaces arranged interiorly thereof in such manner that light passing through the window 19 will be reflected off the mirror 17, the mirror 22, the mirror 21, and then generally pass outwardly through the eye piece 4 in a path generally parallel to the path of incidence through window 19. In this manner by pointing my spotting-scope away from an object on shore, such object may be viewed through the eye piece 4, the light-path passing as aforesaid through the window 19 and reflecting off the mirrors 17, 22 and 21, respectively. The two mirrors are arranged in the assembly 20 so that the mirror 21 may be positioned more generally transversely of the light-path passing longitudinally through the body 1. The mirrors 21 and 22 can readily be removed from the body 1 simply by removing the plug 23.

Spaced intermediately between the extension 12 and the transparent plate 10, the body is provided with two side windows 25 and 26 which have the same general sectional configuration as the walls of the tubular body 1. Transversely aligned with these side openings or windows 25 and 26, I provide a semi-circular reflecting mirror 27. The mirror 27 is fixedly mounted on a rotatable shaft 28, the top of which is suitably rotatably secured to the body 1 by means of, for example, nut 29. Fixed on the bottom of the shaft 28, I provide a degree disc 30 which serves two purposes. The disc 30 may be used as a knob to rotate the mirror 27 and moreover may be used in conjunction with a degree marker 31 as a means for measuring the angle between incident light reflecting from the mirror 27 and the general longitudinal axis of the body 1. The disc 30 may be indexed with peripheral notches and the marker 31 may be so designed that it will resiliently snap as a detent within such notches so that the mirror will not freely rotate and moreover may be set to an angular position with no danger of it moving therefrom. The disc may be suitably secured to the shaft 28 to rotate therewith as by nut 32. Interposed between the nut 29 and the body 1, as well as between the disc 30 and the body 1, there may be placed suitable anti-friction washers 33 and 34, respectively. These washers may be utilized both as a bearing for the nut and disc, respectively, as well as a means to seal the apertures through the body 1 in which the shaft 28 is secured. If desired, the shaft may be provided with enlarged portions 35 more closely to secure such shaft within the apertures of the body.

The mirror 27 has both sides thereof provided with a reflective surface and has a semi-circular central opening 36 therein, the shaft 28 passing centrally through this semi-circular opening 36 as more clearly seen in FIG. 4.

Secured to the front of the body 1 is a suitable bracket 37. The bracket 37 has two ears 38 which closely fit along the sides of the front portion of the body 1. Within the ears 38 are apertures 39 through which pass screws or other suitable fasteners 40. In this manner, the bracket 37 may be pivoted about the fasteners 40 so that the bracket will fold back along the top of the body in the manner generally shown by the arrow 41 in FIG. 2. The centers of the apertures 39 are slightly above the longitudinal axis of the body 1 so that the bracket will clear the top front edge of the body. When the bracket is pivoted to its operating position as shown in FIG. 2, the heel 42 thereof will abut against the lower front edge of the retaining ring 9. In this manner, the bracket provides a firm front shelf or platform extension 43.

Suitably removably secured on this platform 43 is an extension shelf 44 having upturned side portions 45 with a cross-piece 46 extending therebetween. The members 44, 45 and 46 provide a suitable mounting for a generally conventional compass 47. The compass 47 may be any conventionally available compass, however, I prefer to use a compass such as the "Guide-Rite" compass made by the Blackstone Manufacturing Company, Inc. This type of compass has an annular window 48 therein through which the indexed pivoting element 50 may be viewed. The rotating element is generally suspended in a fluid and when properly corrected, the indices thereon will always point in the proper respective polar directions as shown in FIGS. 2 and 4.

It can now be seen that the window 48 of the compass 47 may be viewed through the eye piece 4 along a light-path passing generally centrally longitudinally of the body 1. As seen more clearly in FIG. 4, the shaft 28 can be aligned with the index marker 50 through the window 48 of the compass 47. In this manner, the operator need only obtain the image of an object on shore in the mirror 21 and align this object with the shaft 28. Then moving the eye upwardly to look above the mirror 21, the operator then need only read the azimuth of such object on shore through the window 48 of the compass. It can now be seen that the semi-circular opening 36 in the mirror 27 affords a clear view of the index 50 of the compass. The mirror 21 which can be seen by the phantom lines in FIG. 4 will present the object thereon at the position generally shown at 51, it being remembered that this object is viewed through scope tube 11. The position of the mirror as seen in FIG. 4 does not obstruct the view of an object through mirror 27, but the mirror 21 may, however, be removed from the body 1 after the proper azimuth has been obtained.

*Operation*

With reference to FIG. 1, the operation of my sighting device will now be described. The particularly advantageous fishing spot may be designated at 60 and it is this spot to which the fisherman desires to return. While at such fishing spot, the fisherman may be utilizing my new sighting device to obtain the azimuth of a line 61 passing through the boat at 60 and an object on shore as, for example, a building or boathouse 62. The azimuth of this line may be read as, for example, due south as seen in FIG. 4. Then, through the semi-circular mirror 27 the operator may view a prominent object on shore, as for example, a large tree 63 which is spaced a considerable distance from the other sighting object 62. Once the two objects are in view, in the center portion of the mirror 27 and the mirror 21 respectively, and such object in the mirror 21 is aligned with the shaft 28 so that an azimuth reading may be taken thereon, notations may then be taken of the reading of the disc 30 as well as the compass index 50. However, it is possible to leave the semi-circular mirror at the position in which the image appears centrally thereof and merely note the azimuth of the line 61.

Now when the fisherman desires to return to the spot 60, he need only align himself with the object 62 on the shore and move away therefrom on the proper azimuth. Then, by taking periodic sightings through the semi-circular mirror 27, the fisherman can tell exactly when he has reached spot 60 by the object 63 again appearing centrally in the mirror 27. Thus, once the correct azimuth has been obtained, the plug 23 may be removed since the fisherman need only move the sighting device until the proper index on the compass aligns with the shaft 28 as shown in FIG. 4. Once this heading or direction has been attained, the fisherman need only align the object in the center of the pre-set mirror 27.

The mirror 27 can be rotated through 360° and employed through either window 25 or 26. In this manner, the fisherman may, by proceeding along the line or azimuth 61 toward shore in the direction shown by arrow 64, view the object 63 through the opposite window in the body. The mirror, of course, would have to be properly pre-set to view the object 63. Thus the scope can be used while moving either toward or away from the object 62.

Once the proper azimuth has been attained, the instrument may be collapsed or disassembled for storage purposes by removing the eye piece 4, telescoping the sections 2 and 3, removing the scope tube 11, removing the compass 47 and collapsing the bracket 37 on the top forward portion of the body 1. I have found that my sighting device may be stored, through such elementary disassembling thereof, in a packing box, for example, approximately 9⅝" long, 3½" in width and 5¼" in depth. In this manner, it will be seen that my sighting device may readily be stored in a small out-of-the-way place when not in use.

The parts of my sighting device which are not reflective can be made of any suitable inexpensive material as, for example, plastic, brass, copper or aluminum, it being noted that no iron or tin parts are used in that they generally affect the operation of the compass. Moreover, the various parts of my sighting device need not carefully be assembled to any high degree of accuracy and as a fisherman uses such device, he will become accustomed to the various positions on the mirrors of the proper images that will give him the most accurate results therefrom. Accordingly, it can now be seen that I have provided a device that will readily assist fishermen to return to advantageous fishing spots and which is not extremely complex in operation and moreover, is inexpensive to manufacture.

Other modes of applying the principle of the invention may be employed, change being made as regards the details described, provided the features stated in any of the following claims or the equivalent of such be employed.

I, therefore, particularly point out and distinctly claim as my invention:

1. Sighting apparatus for fishermen and the like comprising a light-path tube, an eye piece on one end of said tube, a window on the other end, a bracket on said other end, a compass mounted on said bracket whereby the compass can be read through said light-path tube, a second transversely extending light-path tube having a rearwardly facing window therein and mirrors in said tubes whereby an object to the rear of the viewer can be viewed through said light-path tube and thereby aligned with a reading on said compass.

2. Sighting apparatus as set forth in claim 1 wherein said first mentioned light-path tube has oppositely facing windows therein, and a revolvable semi-circular mirror mounted between said windows.

3. Sighting apparatus as set forth in claim 2 wherein said mirror is mounted for swinging movement on a vertical pivot shaft.

4. Sighting apparatus as set forth in claim 3 wherein said pivot shaft has an actuating disc mounted thereon exteriorly of said first mentioned light-path tube.

5. Sighting apparatus as set forth in claim 4 wherein said disc is indexed whereby the angle between the longitudinal axis of said first mentioned light-path tube and the incident light reflecting off said semi-circular mirror can be measured.

6. Sighting apparatus as set forth in claim 5 wherein said first mentioned light-path tube is extensionable and said second transversely extending light-path tube and mirrors are readily removable.

7. Sighting apparatus for fishermen and the like comprising a light-path tube, an eye piece on one end of said tube and a window on the other, a bracket on said other end, a compass mounted on said bracket whereby the compass can be read through said light-path tube, oppositely facing windows in said light-path tube, a pivotally mounted semi-circular mirror therebetween whereby objects to either side of the viewer may be viewed through said light-path tube, said semi-circular mirror having a central cutout portion and being mounted on a pivot shaft extending centrally vertically of said tube whereby said shaft may be aligned with a reading on said compass, said pivot shaft having an actuating disc mounted thereon exteriorly of said tube whereby said semi-circular mirror may be revolved 360°, and a set of mirrors mounted in said light-path tube whereby objects to the rear of said viewer may be viewed therethrough and aligned with said shaft and said compass.

8. Sighting apparatus as set forth in claim 7 wherein said set of mirrors is transversely aligned with a second tube extending normal to said light-path tube, and having therein a rearwardly opening window.

9. Sighting apparatus as set forth in claim 8 wherein said set of mirrors and said semi-circular mirror are positioned so that the viewer can simultaneously view an azimuth on said compass and an object on shore through said semi-circular mirror.

References Cited in the file of this patent

UNITED STATES PATENTS

| | | |
|---|---|---|
| 2,946,256 | Tiffany | July 26, 1960 |
| 2,953,060 | Carbonara | Sept. 20, 1960 |

OTHER REFERENCES

"Two Position Finding Instruments," Brochure, May 6, 1958, available from Ilon Industries Inc., 25–27 Main St., Hempstead, N.Y., pages 1–11 of interest.